March 10, 1964 H. J. McCREARY 3,124,651

TOLL CHARGE COMPUTER

Filed Feb. 20, 1959 4 Sheets-Sheet 1

INVENTOR.
Harold J. McCreary

BY C. R. Sipe

Atty.

INVENTOR.
Harold J. McCreary
BY C. R. Sipe
Atty.

March 10, 1964 H. J. McCREARY 3,124,651

TOLL CHARGE COMPUTER

Filed Feb. 20, 1959 4 Sheets-Sheet 3

INVENTOR.
Harold J. McCreary
BY C. R. Sipe
Atty.

March 10, 1964 — H. J. McCREARY — 3,124,651

TOLL CHARGE COMPUTER

Filed Feb. 20, 1959 — 4 Sheets-Sheet 4

INVENTOR.
Harold J. MC Creary
BY C. R. Sipe
Atty.

United States Patent Office 3,124,651
Patented Mar. 10, 1964

3,124,651

TOLL CHARGE COMPUTER

Harold J. McCreary, Lombard, Ill., assignor to Automatic Electric Laboratories, Inc., a corporation of Delaware Filed Feb. 20, 1959, Ser. No. 794,552
9 Claims. (Cl. 179—7.1)

The present invention relates to automatic telephone systems and more particularly to computing apparatus operative to compute toll charges for certain telephone calls in the system.

In an automatic toll ticketing telephone system the area served by the telephone system is divided into a plurality of zones, each zone including one or more telephone offices. Telephone connections established between subscribers in different offices in different zones and between subscribers in different offices in the same zone are handled on a toll basis. Toll charges for these connections are assessed against the calling subscriber's substation in accordance with the distance between the originating and the termination exchanges, and the time duration of the telephone connection.

Each telephone connection is established automatically under the control of the calling subscriber's dial. A record is produced of the particulars concerned, including the office code digits for identifying the calling and the called exchanges and numerical digits identifying both the calling and called subscribers' substations, as well as other pertinent particulars such as the rate of charge applicable to the connection, the date, and, based on the rate and the duration of the call, the toll charge for the connection.

In an automatic toll ticketing telephone system, the operation is usually started with the subscriber dialing the toll access code to access the toll ticketing equipment. In response to the dialing of the toll access code, the calling station's directory number is detected and recorded. The dialing of the called zone and called office digits will cause these digits to be registered, translated, and all of the leads be extended to the called office. During the setting up of the connection to the called subscriber's line a ticketer will remain in the circuit for the purpose of registering and storing various items of record information. Information registered therein includes the calling subscriber number, the called office code digits and the called subscriber number. As soon as the connection is completed between the calling and the called subscriber, the call will be timed in response to the release of the connection. The above-mentioned items of information that are stored in the ticketer plus an indication of the duration of the call, will be transferred to a tabulator. The tabulator will control a tape perforator or other similar means to produce a record of the completed call. This information may include the month, day, hour and minute and time of the termination of the call, the complete directory numbers of the calling line, and the called line, the duration of the call and the toll charge for the call which has been transmitted to the tabulator from a computer. It is in the computer that information as to the calling and called stations as well as the duration of the timed telephone connection are combined to provide the toll charge applicable to the connection. A computer of this nature for use in the telephone system as outlined above has been disclosed in the co-pending application of J. E. Ostline et al., dated April 3, 1957, Serial No. 650,452. This computer is totally effective to provide the necessary toll charge information to the tabulator. However, it employs numerous quantities of relays which are subject to the usual limitations of electromechanical devices such as necessity for spring adjustment, contact wear, etc.

Accordingly, it is the main object of the present invention to provide, in an automatic toll ticketing telephone system, an apparatus for determining the charge applicable to each toll call using solid state devices. Another object of the present invention is to provide a toll charge computer employing a minimum of electromechanical devices.

A still further object of the present invention is to provide a toll charge computer that will be small in size and simple to install.

One feature of the instant invention shall be the use of magnetic cores having square hysteresis loop characteristics as devices for combining information.

Another feature shall be the inclusion of a plurality of inductive devices for selectively marking magnetic cores.

Other objects and features of the instant invention pertain to the particular arrangement of circuit elements and apparatus in an automatic telephone system and will be apparent in reference to the following specification, claims, and drawings.

Figure 1:
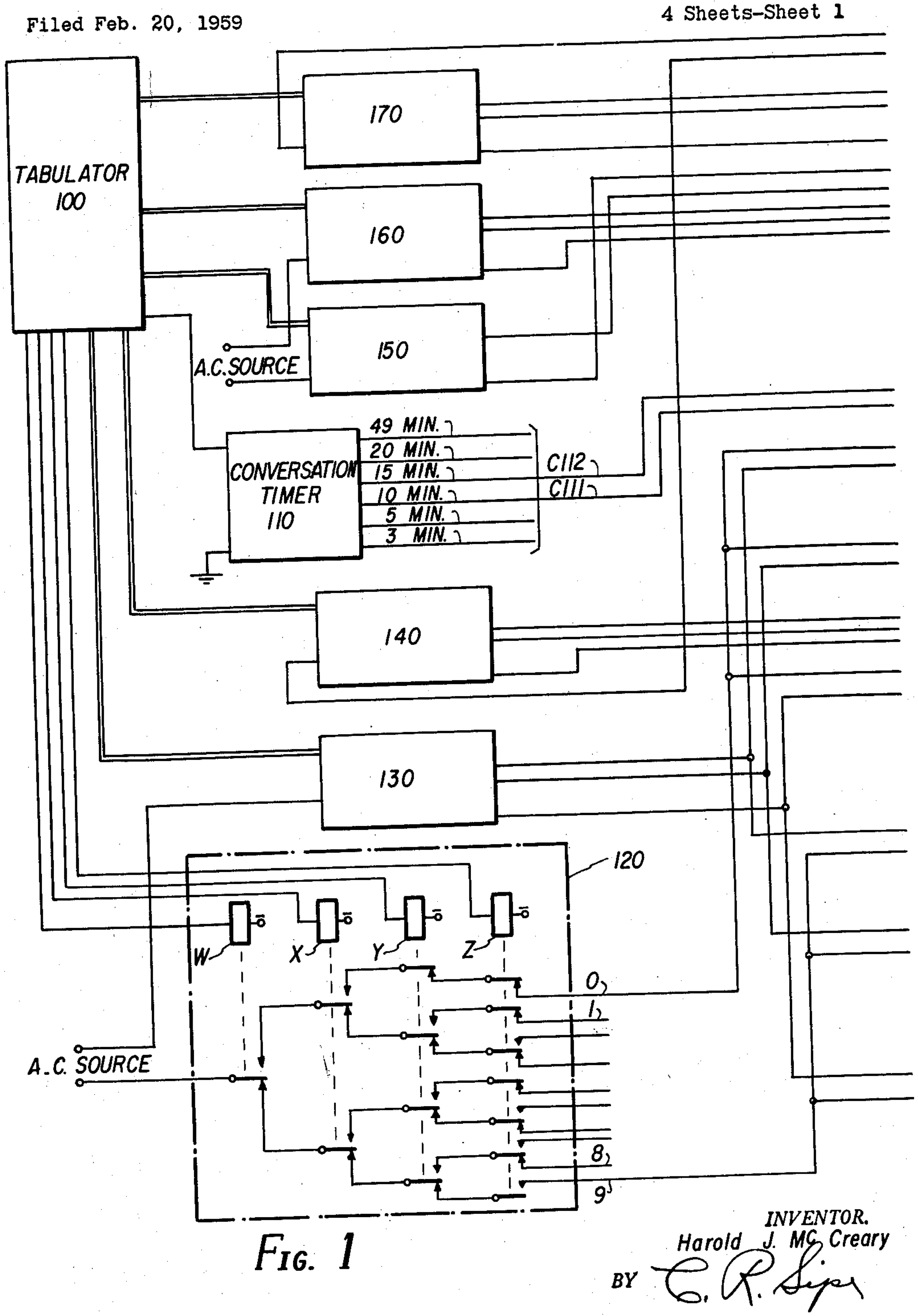
FIG. 1 is a circuit diagram of the translation and selection portion of a computer embodying this invention.
Figure 2:
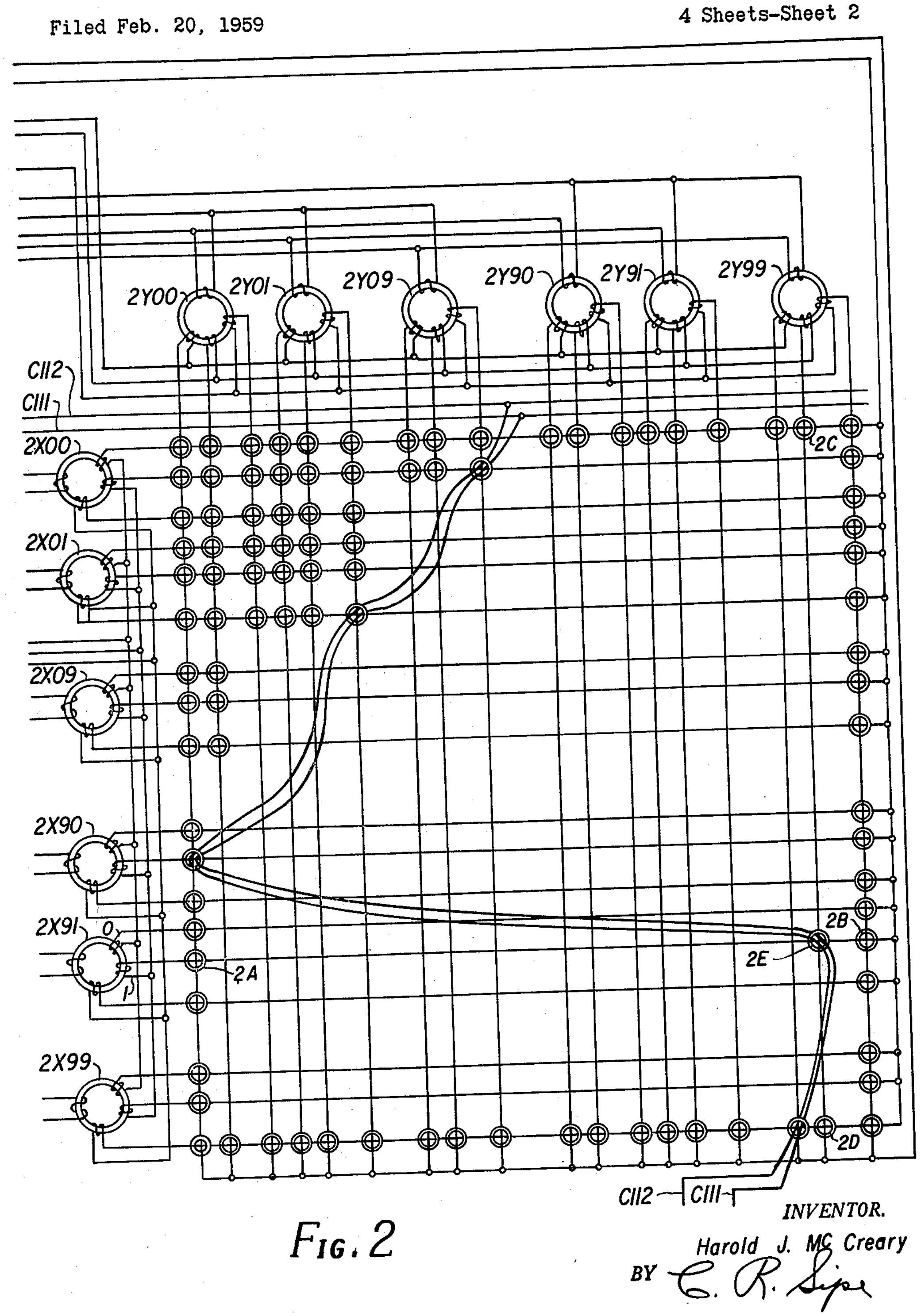
FIG. 2 is a circuit diagram of a core matrix employed as a portion of a computer embodying this invention.
Figure 3:
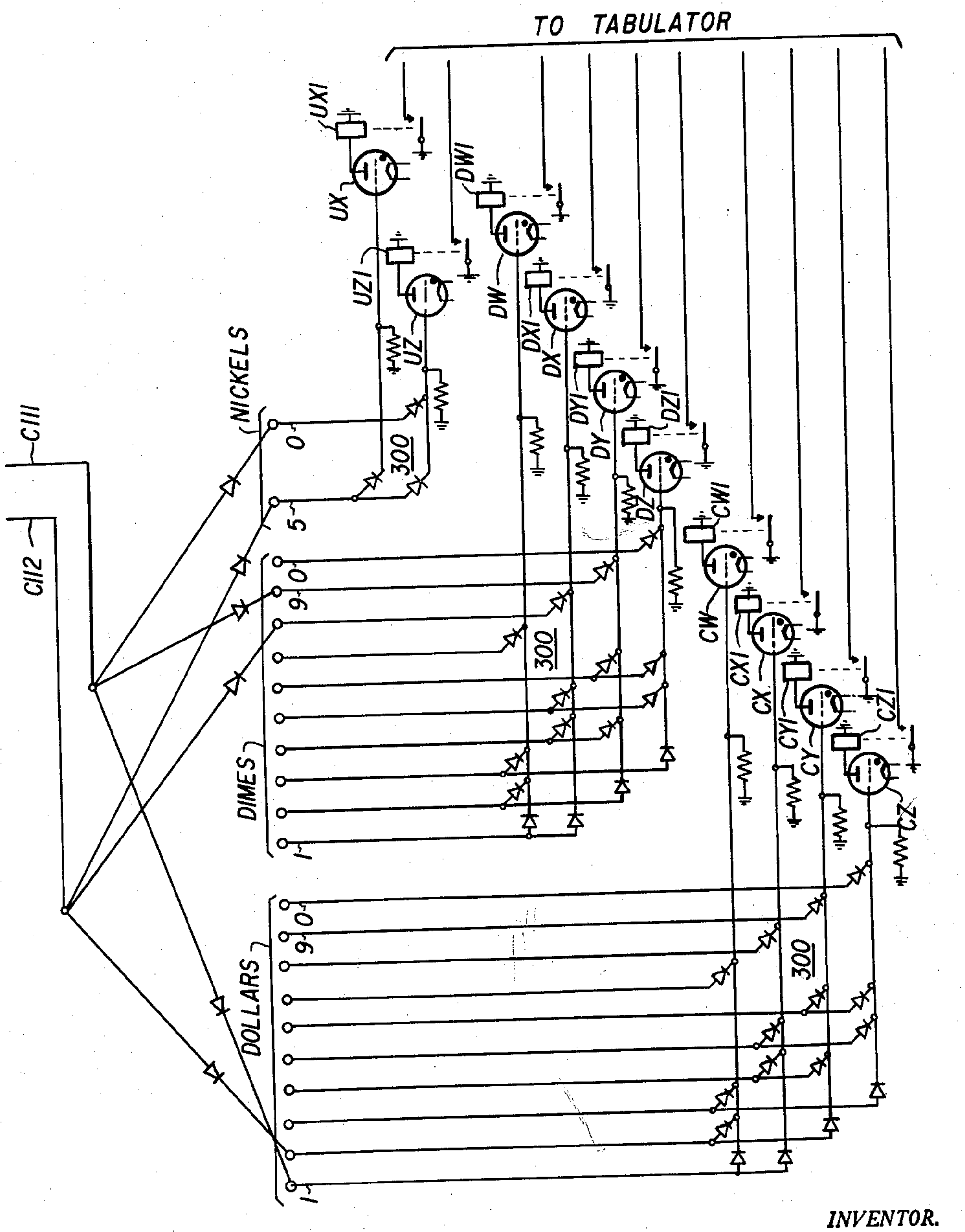
FIG. 3 is a circuit diagram of the registers and toll charge transmission portion of a computer embodying this invention.

In the case of the first embodiment, FIG. 1 should be placed to the left of FIG. 2 and FIG. 3 underneath FIG. 2. Similarly, in the case of the second embodiment, FIG. 1 should be placed to the left of FIG. 4 and FIG. 3 underneath FIG. 4.

Generally described, the toll charge computer, according to both embodiments of the invention shown herein, can be described as an apparatus for combining three bits of information received from a tabulator in a toll ticketing telephone system. The first of these is a calling station office code number, the second a terminating station office code number, and the third an indication of the duration of the toll call. Indication of the combination of the originating and calling station office code numbers is made first; this is then translated into a predetermined toll rate and subsequently coupled with the information as to the length of the toll call to provide a toll charge; this in turn is extended back to the tabulator.

More specifically, binary code markings indicative of the three digit office code numbers associated with the originating station and the terminating station are extended from the tabulator through a plurality of relay trees to selectively extend two potentials to either a core matrix or a core column, that may be found in the several embodiments of this invention. These potentials, which have been selectively extended, are used to change the flux state of one of the magnetic cores having square hysteresis loop characteristics of either the core matrix or the core column. This change of state in one of the aforementioned cores gives an indication that a toll call has been placed between the two points represented by the aforementioned station office code numbers.

By means of read-out wires selectively threaded through the aforementioned cores, detection of a core with a changed flux state is made, and consequently translated into a toll rate. Actually, each read-out wire is one of a plurality of wires each associated with a particular elapsed time period indicated by a conversation timer associated with the tabulator. Since only one read-out wire, the one selected by the conversation timer, may be actuated by the change in the flux state of one of the aforementioned cores, the rate is applicable to the toll call in question based on both the originating and terminating office locations as well as the time elapsed. This is translated into binary indications of the applicable toll charges, which in turn are transmitted back to the tabulator to facilitate recording of the necessary information in the processing of the toll call.

Each office in the telephone system is identifiable by a three digit code. All stations associated with said offices are identifiable by inclusion of this code number as a portion of their directory number. Utilizing this arrangement, the computer of the instant invention comprises a plurality of magnetic cores each being associated with a combination of the office code numbers of an originating station and a terminating station. These cores are so arranged that they may be selectively marked by passing two potentials through a specific core so that the total voltage is adequate to change the direction of the magnetic flux of the selected core.

Specifically, three relay trees for converting an originating office code number from its binary form, as received from the tabulator, to a decimal form, and three more relay trees for converting a terminating office code number from a binary to a decimal form are utilized to selectively extend these potentials to the cores associated with the particular combination of originating and terminating codes involved.

The duration of each toll call has been timed by a conversation timing device that placed a ground marking on a read-out wire associated with that particular length of toll call. These read-out wires are selectively threaded through all the cores in the matrix or core column that are found in the two illustrated embodiments of this invention, that are indicative of the same toll rate. Upon the extension of the identifying potential associated with the calling and called stations to one of the cores, the resultant change in the state of the magnetic flux of said core induces a pulse of potential in the read-out wire marked by the conversation timing device. This pulse is in turn transmitted through an array of diodes and consequently connected in a selective manner to several thyratrons which, when fired, operate relays to give binary indications of the toll charge applicable to the particular combination of originating and terminating stations involved as well as the conversation length. This information is returned to the tabulator and recorded there, along with such additional information as may be supplied, to complete all the particulars necessary for recording the toll charges applicable to a toll connection.

Operation of a computer embodying the instant invention and including a core matrix can best be understood by reference to FIGS. 1, 2, and 3. Assuming now that the originating station office code number is "911" and the terminating station office code number is "991" and the toll call will be 10 minutes long, the following events will transpire to effect the registration of the pertinent toll charges associated with the call between two stations in said offices.

Ground potential is extended from the tabulator 100 to relay Z in relay tree 120, likewise to relays W and Y in a similar relay tree 130 and to relays W and Y in a similar relay tree 140. Extension of this ground to operate relay Z in relay tree 120 will first extend the portion of the circuit from one terminal of the A.C. source to transformers 2X90, 2X91, etc., to transformer 2X99. At the same moment the extension of ground to relays W and Y in relay tree 130 will cause the extension of the second half of the circuit from the other terminal of the A.C. source to transformers 2X01, 2X11, etc., to 2X91 inclusive. Circuit connections now extend from both sides of the alternating current source only to transformer 2X91. It is obvious, therefore, that an A.C. potential will be induced in the secondary windings of transformer 2X91 only. The operation of relays W and Y in relay tree 140 is effective to complete a circuit loop including secondary winding No. 1 on all of the transformers 2X00 to 2X99 inclusive. Since an A.C. voltage is present in transformer 2X91 by virtue of the aforementioned series of events, this voltage will then be extended by induction into the secondary winding No. 1 of transformer 2X91.

As may be apparent by reference to FIG. 2, the potential induced in secondary winding No. 1 of transformer 2X91 is extended through the centers of an entire row of cores 2A to 2B. This induced A.C. voltage extending over the circuit loop that passes through the centers of the aforementioned cores is of a sufficient magnitude to drive the state of these cores halfway toward the saturation point.

Referring now to the terminating station office code number "991," ground markings from the tabulator are extended to relay Z in relay tree 150 and to relay Z in relay tree 160. Operation of these relays is effective to extend alternating current through the contacts of these relays to the primary windings of transformer 2Y99 in a manner similar to that disclosed in connection with the extension of potential to transformer 2X91. Ground markings are also extended to relays W and Y of relay tree 170 which in turn operate to complete the circuit loop including the secondary winding No. 1 on all of the transformers 2Y00 to 2Y99 inclusive. Since an A.C. voltage is present only in the primary winding of transformer 2Y99 as noted above, the A.C. voltage is induced only into the secondary winding No. 1 of transformer 2Y99, and then through the entire row of magnetic cores 2C to 2D inclusive. This voltage passing through the center of the aforementioned cores is of sufficient magnitude to drive these cores halfway to the saturation point. It should now be noted that core 2E located at the junction of the two aforementioned rows of cores, one horizontal and one vertical, each carrying a half saturating potential, is driven to a fully saturated condition by the additive effects of the present potentials.

As is well known in the art, a pulse of current may be induced in any wire passed through the center of the saturated core, at the moment of saturation. To utilize this effect a plurality of read-out wires are extended from a conversation timing device 110 to the center of one or more of the cores that comprise the core matrix of FIG. 2. A single read-out wire may be threaded through several cores in as much as the same toll rate may apply for several combinations of originating and terminating stations, even through the locations have no relation. Actually a plurality of read-out wires are extended through each of the aforementioned several cores with each wire having a circuit connection to conversation timing device 110 and being connected by the conversation timing device to ground in accordance with the specific time period associated with the duration of a toll call. Assuming now that the duration of the toll call placed between the originating station and the terminating station was 10 minutes, a ground was placed only on the 10 minute wire C111 which would be one of the plurality going through the center of core 2E as well as several other cores having the same applicable rate, through an array of diodes 300 shown in FIG. 3 used as back-feed preventing impedance devices to thyratrons CW and CX, BY and UZ. The saturation of core 2E is effective to induce a pulse of potential in wire C111 which is of a sufficient magnitude to change the bias of the aforementioned thyratrons causing them to fire. The firing of these tubes in turn supplies the necessary potential to operate relays CW1, CX1, DY1, and UZ1 to extend ground markings in binary form indicative of the toll charge for the subject toll call. In this instance the toll charge being $1.90 for the ten-minute period, as indicated by the row of terminals shown at the top of FIG. 3. The ground markings are extended to tabulator 100 for recording therein. It should be noted that utilization of the core matrix provides a high degree of flexibility for rate changes, requiring only re-threading of the appropriate read-out wires.

Figure 4:
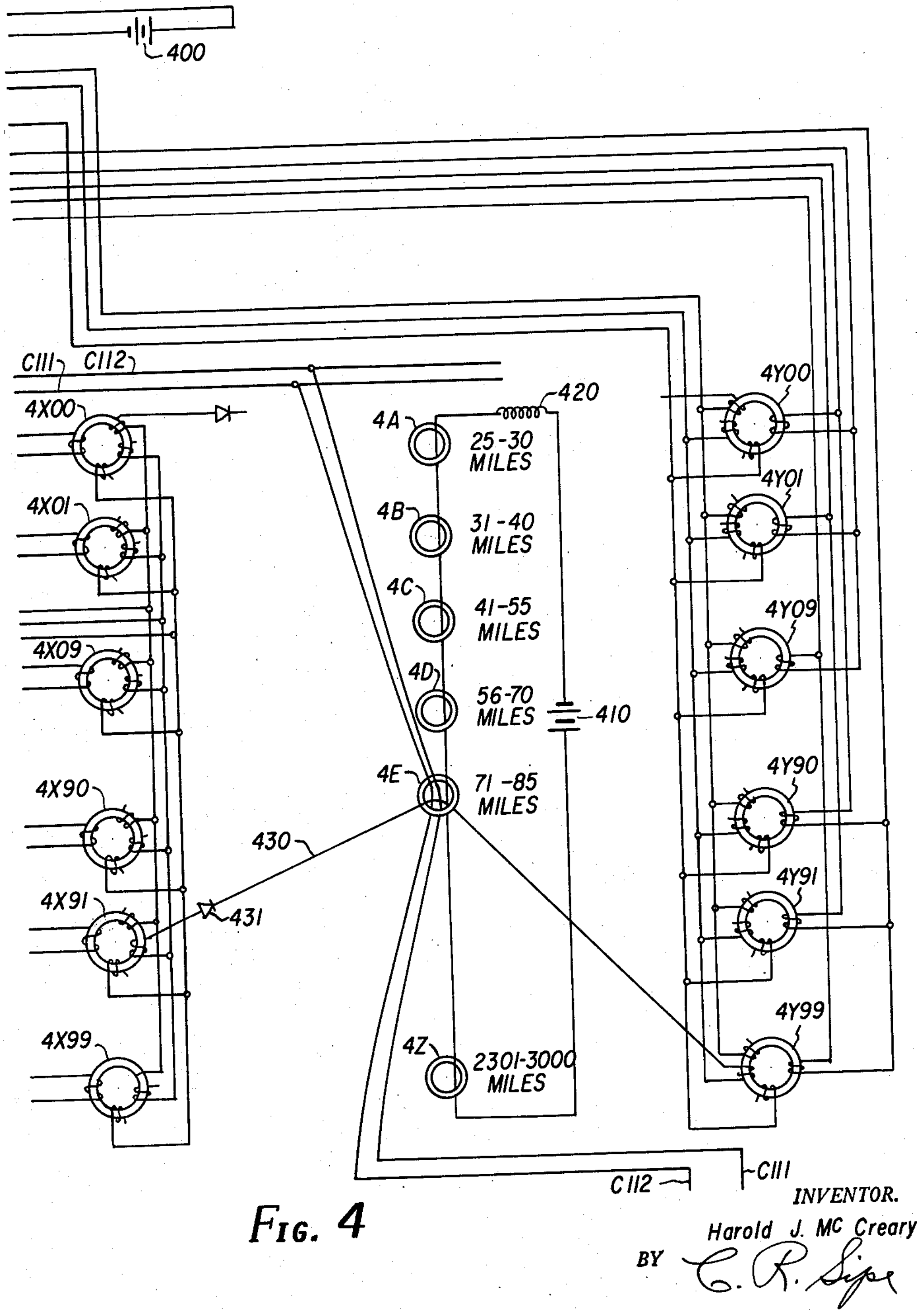
FIG. 4 is a circuit diagram of a core column employed in a computer according to a modified embodiment of this invention.

An understanding of the second embodiment of this invention may be had from the following explanation of FIGS. 1, 3, and 4. In a manner similar to that outlined above, an alternating current potential is induced into the No. 1 secondary windings of transformers 4X91 and 4Y99. These two secondary windings are connected by conductor 430 passing through the center of core 4E which is one of the cores 4A and 4Z that comprise the core column illustrated in FIG. 4. It will be noted that cores 4A to 4Z inclusive are so arranged that the biasing battery 410 will cause their magnetic fluxes to be aligned in the same direction. Inasmuch as an alternating current potential exists in the No. 1 secondary windings of transformers 4X91 and 4Y99 this potential will tend to pass through circuit conductor 430. However, because of the presence of diode 431, current will be allowed to pass in one direction only. Since the flux due to current flow in conductor 430 is in opposition to the flux due to bias battery 410, and since the voltages of the two current sources are of such magnitude that the first-mentioned flux is twice as great as the biasing flux due to battery 410, the flux in core 4E will be reoriented to the opposite direction.

To insure that core 4E will have its flux reoriented only by the combination of two reorienting potentials representative of an originating and a terminating station. A partial biasing battery 400, equal to one marking potential is placed in the secondary winding circuit in opposition to the marking potentials.

The reorientation of a flux of core 4E will induce a pulse of potential in the read-out wire C111 extending from the conversation timer in a manner similar to that disclosed in connection with the previously described embodiment of this invention and in turn will be extended to several of the thyratrons disclosed in FIG. 3 to register the applicable toll charge. In the present embodiment each core of the aforementioned core column is indicative of a distance figure. Wires, such as 430, corresponding to all originating and terminating station combinations that are indicative of the same distance will be passed through the same core. Thus, it may be seen that a single core of this embodiment will function to take the place of several cores as used in the aforementioned embodiment of this invention utilizing a core matrix. However, rate changes applicable to only one combination of originating and terminating offices are not provided for.

Appended hereto are a series of claims which are believed to define the scope of this invention.

What is claimed is:

1. In an automatic toll ticketing telephone system comprising a plurality of offices each having a plurality of stations identifiable as being associated with said office by a common code, a tabulator, and a toll charge computer including: a plurality of magnetic cores each having square hysteresis loop characteristics, and each representative of a combination of an originating station office code and a terminating station office code; means for selectively marking one of said cores; means operated for detecting a marked core, comprising a conversation timing device, a plurality of read-out wires having circuit connections to said conversation timing device, and each selectively threaded through all of said cores representative of the same toll charge, said wires adapted to receive a pulse of potential induced by the marking of one of said cores; means responsive to the operation of said detecting means for registering the marking of said core as a toll charge; and means for extending markings indicative of said toll charge to the telephone system.

2. In an automatic toll ticketing telephone system comprising a plurality of offices each having a plurality of stations identifiable as being associated with said office by a common code, a tabulator, and a toll charge computer including: a plurality of magnetic cores each having square hysteresis loop characteristics, and each representative of a combination of an originating station office code and a terminating station office code; means for selectively marking one of said cores; means operated for detecting a marked core; means responsive to the operation of said detecting means for registering the marking of said core as a toll charge, comprising an array of back-feed preventing impedance devices, and a plurality of binary registers including a plurality of thyratrons, selectively connected through said array of back-feed preventing impedance devices to said detecting means, and responsive to the operation of said detecting means to register a toll charge; and means for extending markings indicative of said toll charge to the telephone system.

3. In an automatic toll ticketing telephone system comprising a plurality of offices each having a plurality of stations identifiable as being associated with said office by a common code, a toll charge computer including: a plurality of saturable magnetic cores each having square hysteresis loop characteristics, and each representative of a combination of an originating station office code and a terminating station office code; means for selectively saturating one of said cores; means operated for detecting a saturated core, comprising a conversation timing device, a plurality of read-out wires having circuit connections to said conversation timing device, and each selectively threaded through all of said cores representative of the same toll charge, said wires adapted to receive a pulse of potential induced by the saturation of one of said cores; means responsive to the operation of said detecting means for registering the saturation of said core as a toll charge; and means for extending markings indicative of said toll charge to the telephone system.

4. In an automatic toll ticketing telephone system comprising a plurality of offices each having a plurality of stations identifiable as being associated with said office by a common code, a toll charge computer including: a plurality of saturable magnetic cores each having square hysteresis loop characteristics, and each representative of a combination of an originating station office code and a terminating station office code; means for selectively saturating one of said cores; means operated for detecting a saturated core; means responsive to the operation of said detecting means for registering the saturation of said core as a toll charge, comprising an array of back-feed preventing impedance devices, and a plurality of binary registers including a plurality of thyratrons selectively connected through said array of back-feed preventing impedance devices to said detecting means and responsive to the operation of said detecting means to register a toll charge; and means for extending markings indicative of said toll charge to the telephone system.

5. In an automatic toll ticketing telephone system comprising a plurality of offices each having a plurality of stations identifiable by a three digit binary common code as being associated with said office, a toll charge computer including: a plurality of magnetic cores each representative of a combination of the office codes of an originating station and a terminating station, said cores adapted to be selectively marked by a combination of two partially marking potentials; a first, second, and third relay tree for converting an originating office code from binary to decimal form, and fourth, fifth, and sixth relay trees for converting a terminating office code from binary to decimal form, a first plurality of inductive devices controlled by said originating codes for selectively connecting a partially marking potential to the cores representative of one of said originating codes, a second plurality of inductive devices controlled by said terminating codes for selectively connecting a partially marking potential to the cores representative of one of said terminating codes; a conversation timing device; a plurality of read-out wires having circuit connections to said conversation timing device, each selectively threaded through all of said cores representative of the same toll charge, and adapted to receive a pulse of potential induced by the marking of one of said cores; an array of back-feed preventing impedance devices; a plurality of binary registers including a plurality of thyratrons selectively connected through said array of back-feed preventing impedance devices to said read-out wires, and responsive to said potential induced in one of said read-out wires by said marked core to register a toll charge as determined by the corresponding code combination and conversation time; and a plurality of relays for extending markings indicative of said toll charge to the telephone system.

6. In an automatic toll ticketing telephone system comprising a plurality of offices each having a plurality of stations identifiable as being associated with said stations by a common code, a tabulator, and a toll charge computer including: a plurality of magnetic cores each having square hysteresis loop characteristics, and each biased to effect flux orientation in one direction, and each representative of a combination of an originating station office code and a terminating station office code; means for selectively reorienting the flux of one of said cores; means operated for detecting a core having a reoriented flux, comprising a conversation timing device, a plurality of read-out wires having circuit connections to said conversation timing device, and each selectively threaded through one of said cores representative of a specific toll charge, said wires adapted to receive a pulse of potential induced by the reorientation of flux of one of said cores; means responsive to the operation of said detecting means for registering the flux reorientation of said cores as a toll charge; and means for extending markings indicative of said toll charge to the tabulator.

7. In an automatic toll ticketing telephone system comprising a plurality of offices each having a plurality of stations identifiable as being associated with said stations by a common code, a tabulator, and a toll charge computer including: a plurality of magnetic cores each having square hysteresis loop characteristics, and each biased to effect flux orientation in one direction, and each representative of a combination of an originating station office code and a terminating station office code; means for selectively reorienting the flux of one of said cores; means operated for detecting a core having a reoriented flux; means responsive to the operation of said detecting means for registering the flux reorientation of said cores as a toll charge, comprising an array of back-feed preventing impedance devices, and a plurality of binary registers including a plurality of thyratrons selectively connected through said array of backfeed preventing impedance devices to said detecting means, and responsive to the operation of said detecting means to register a toll charge; and means for extending markings indicative of said toll charge to the tabulator.

8. In an automatic toll ticketing telephone system comprising a plurality of offices each having a plurality of stations identifiable by a three digit binary common code as being associated with said office, a toll charge computer including: a plurality of saturable magnetic cores arranged in matrix form, each having square hysteresis loop characteristics, and each representative of a combination of the office codes of an originating station and a terminating station, said cores adapted to be selectively driven to a saturated state by a combination of two partially saturating potentials; a first, second, and third relay tree for converting an originating office code from binary to decimal form, and fourth, fifth, and sixth relay trees for converting a terminating office code from binary to decimal form, a first plurality of inductive devices controlled by said originating codes for selectively connecting a partially saturating potential to the cores representative of one of said originating codes, a second plurality of inductive devices controlled by said terminating codes for selectively connecting a partially saturating potential to the cores representative of one of said terminating codes; a conversation-timing device; a plurality of read-out wires having circuit connections to said conversation timing device, each selectively threaded through all of said cores representative of the same toll charge, and adapted to receive a pulse of potential induced by the saturation of one of said cores; an array of back-feed preventing impedance devices; a plurality of binary registers including a plurality of thyratrons selectively connected through said array of back-feed preventing impedance devices to said read-out wires, and responsive to said potential induced in one of said read-out wires by said saturated core to register a toll charge determined by the corresponding code combination and conversation time; and a plurality of relays for extending markings indicative of said registrations to the telephone system.

9. In an automatic toll ticketing telephone system comprising a plurality of offices each having a plurality of stations identifiable by a three digit binary common code as being associated with said office, a toll charge computer including: a plurality of magnetic cores each biased to effect flux orientation in one direction, and adapted to be reoriented in the opposite direction by a combination of two partially reorienting potentials, each of said cores representative of a combination of the office codes of an originating station and a terminating station; a first, second, and third relay tree for converting an originating office code from binary to decimal form, and fourth, fifth, and sixth relay trees for converting a terminating office code from binary to decimal form, a first plurality of inductive devices controlled by said originating codes for selectively connecting a partially reorienting potential to the cores representative of one of said originating codes, a second plurality of inductive devices controlled by said terminating codes for selectively connecting a partially reorienting potential to the cores representative of one of said terminating codes; a conversation timing device; a plurality of read-out wires having circuit connections to said conversation timing device, and each selectively threaded through a core representative of a specific toll charge, and adapted to receive a pulse of potential induced by the reorientation of the flux of said cores; an array of back-feed preventing impedance devices; a plurality of binary registers with a plurality of thyratrons selectively connected through said array of back-feed preventing impedance devices to said read-out wires, and responsive to said potential induced in one of said read-out wires by said core with reoriented flux to register a toll charge determined by the corresponding code combination and conversation time; and a plurality of relays extending markings indicative of said registrations to said telephone system.

References Cited in the file of this patent

UNITED STATES PATENTS

| | | |
|---|---|---|
| 2,297,365 | Ostline | Sept. 29, 1942 |
| 2,599,358 | Cahill | June 3, 1952 |
| 2,749,037 | Stibitz | June 5, 1956 |
| 2,767,246 | Retallack | Oct. 16, 1956 |
| 2,820,956 | Rueger | Jan. 21, 1958 |
| 2,843,838 | Abbott | July 15, 1958 |
| 2,916,552 | Wolf | Dec. 8, 1959 |